No. 859,076. PATENTED JULY 2, 1907.
E. KEMPSHALL.
COMPOSITE TIRE SECTION.
APPLICATION FILED APR. 28, 1906. RENEWED MAY 9, 1907.
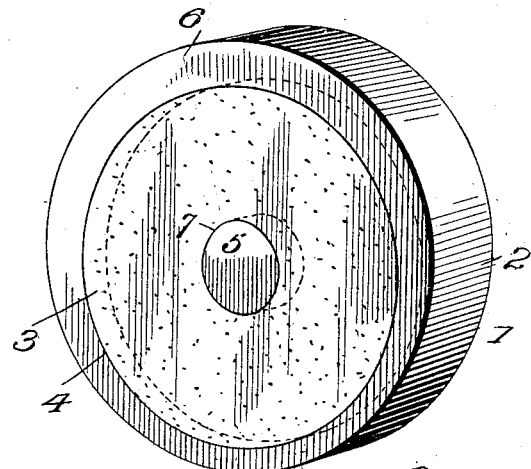
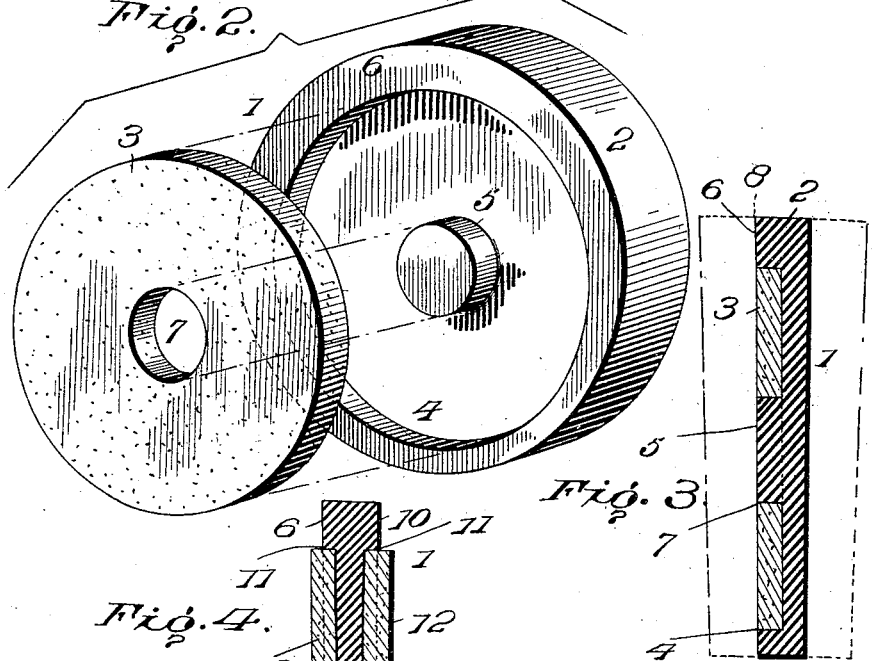
Witnesses
Walter A. Williams
Alice H. Bennett
Inventor
Eleazer Kempshall
By
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

COMPOSITE TIRE-SECTION.

No. 859,076.      Specification of Letters Patent.      Patented July 2, 1907.

Application filed April 28, 1906. Renewed May 9, 1907. Serial No. 372,764.

*To all whom it may concern:*

Be it known that I, ELEAZER KEMPSHALL, a citizen of the United States, residing at Boston, in the county of Suffolk and State of Massachusetts, have invented certain new and useful Improvements in Composite Tire-Sections, of which the following is a specification.

This invention relates to an improved composite section used in the formation of tires.

With a certain type of tire it is essential that the trade be supplied with tire sections of various sizes, and for repair and manufacturing purposes. According to my present invention I propose to provide a composite tire section formed of two members, one of which is of resilient or vulcanizable material, and the other of leather or other non-resilient material. These sections are designed to co-operate with each other when assembled in tire form, and vulcanized to embed the leather or non-resilient members in the resilient members to provide a covering. Obviously where tires a e used which are formed of transverse sections, the trade must be furnished with the sections to enable those skilled in the art to make and repair the tires, and to meet this requirement I have devised the structure herein described and claimed.

In the drawings—Figure 1 is a perspective view of my improved composite tire section. Fig. 2 is a similar view, the members forming a section being separated. Fig. 3 is a vertical section of a section. Fig. 4 is a vertical sectional view of a slight modification.

The numeral 1, indicates a composite tire section as an entirety, composed of two members 2 and 3, the one being of resilient material, and the other being of non-resilient material. The resilient member 2, is provided with a depression 4, which is eccentrically disposed in relation to the outer contour of the member in which it is formed. A lug 5, extends outwardly from the base of the depression, which forms a portion of a core when the sections are arranged in tire form. By disposing the depression eccentric to the outline of member 2, a tread portion 6, is provided, to resist strain, as will be readily understood. The member 3, is formed of leather or other non-resilient material, and conforms to the shape of the depression 4, and is formed with an opening 7, to receive lug 5. Member 3, is equal in thickness to the depth of the depression 4, and as the face of the lug 5, is on a plane with the face of member 2, a smooth and uniform surface is provided when the two members are assembled to form a composite section. The composite section as a whole tapers in elevation, to form a ring and fit snugly when they are placed side by side to form a tire, the flush surface of the two members abutting against the flat surface 8, of an adjacent section.

In Fig. 4, I have shown a slight modification, wherein, 10 represents a resilient member provided on opposite sides with depressions 11—11, about half the depth of the depression in member 2. In depressions 11—11, fit members 12—12, of non-resilient material, and they are of sufficient thickness to extend beyond the surface of member 10, to fit the depression of an adjacent member 10. The lugs 13—13, may be made separate, and inserted in openings 14—14 in the members 12, as clearly shown.

The sections are intended to be assembled side by side (as shown in dotted lines in Fig. 3) and vulcanized, which unites the contacting surfaces of the resilient members, and embeds the non-resilient sections to strengthen the structure. The sections are therefore manufactured and sold to the trade, and by forming them as herein described a tire may be manufactured and repaired in a cheap and convenient manner.

The article when set up is compact and can be packed in a small space for shipping and storing purposes.

What I claim is—

1. As an improved article of manufacture, a composite tire section composed of a resilient member having a depression, and a non-resilient member fitting loosely within the depression of the resilient member, the latter member extending beyond and overlapping the edge of the non-resilient member.

2. As a new article of manufacture, a composite tire section composed of a resilient member having a depression and a lug in the depression, and a non-resilient section formed with an opening, the non-resilient section fitting in the depression and the opening receiving the lug of the resilient section.

3. As a new article of manufacture, a composite tire section composed of a resilient member of vulcanizable material, and a leather member seated in the resilient member.

4. As an improved article of manufacture, a composite tire section, comprised of a rubber member having a depression and a rubber lug, and a leather member having an opening, the leather member fitting in the depression and the opening receiving the rubber lug of the rubber member.

5. As a new article of manufacture, a composite tire section, composed of a resilient member having a depression and a resilient lug, and a non-resilient member having an opening to receive the lug and fitting in the depression of the resilient member.

6. As an improved article of manufacture, a composite tire section, composed of a resilient member with depressions formed on opposite sides, and non-resilient members fitting in the depressions, the resilient member extending beyond and overlapping the edges of the non-resilient member.

7. As an improved article of manufacture, a composite tire section, composed of a resilient member with depressions on opposite sides, resilient lugs in the depressions, and non-resilient members having openings to receive the lugs, the non-resilient members fitting in the depressions of the resilient members.

8. As a new article of manufacture, a composite tire section composed of a resilient member formed with a depression eccentrically disposed with relation to the contour of the member to form a part of a tire thread, and a non-resilient member fitting within the depression of the resilient member.

9. As an improved article of manufacture, a composite tire section composed of two members, one of said members being formed of resilient material and the other member formed of non-resilient material, one of said members fitting in the other, the latter member being larger and overlapping the edge of the member fitting therein.

In testimony whereof I have signed my name to this specification in the presence of two subscribing witnesses.

ELEAZER KEMPSHALL.

Witnesses:
J. D. YOAKLEY,
JNO. IMIRIE.